(12) United States Patent
Truong et al.

(10) Patent No.: US 9,762,601 B2
(45) Date of Patent: Sep. 12, 2017

(54) TRIP ANOMALY DETECTION SYSTEM

(71) Applicant: Uber Technologies, Inc., San Francisco, CA (US)

(72) Inventors: Michael Truong, San Francisco, CA (US); David Purdy, Millbrae, CA (US); Rami Mawas, Dublin, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 14/742,273

(22) Filed: Jun. 17, 2015

(65) Prior Publication Data
US 2016/0373473 A1 Dec. 22, 2016

(51) Int. Cl.
H04L 29/06 (2006.01)
H04L 29/08 (2006.01)
H04W 4/02 (2009.01)

(52) U.S. Cl.
CPC ...... H04L 63/1425 (2013.01); H04L 63/1416 (2013.01); H04L 67/30 (2013.01); H04W 4/028 (2013.01)

(58) Field of Classification Search
CPC .......................... H04L 63/1416; H04L 63/1425
See application file for complete search history.

(56) References Cited

U.S. PATENT DOCUMENTS

| | | | |
|---|---|---|---|
| 6,341,255 B1 | 1/2002 | Lapidot | |
| 6,356,838 B1 | 3/2002 | Paul | |
| 6,378,072 B1 * | 4/2002 | Collins | G06F 21/572 713/161 |
| 6,646,604 B2 * | 11/2003 | Anderson | G01S 5/02 342/463 |
| 7,113,864 B2 | 9/2006 | Smith et al. | |
| 7,133,770 B2 | 11/2006 | Zhao | |
| 7,321,823 B2 | 1/2008 | Brülle-Drews | |
| 7,463,975 B2 | 12/2008 | Bruelle-Drews | |
| 8,086,400 B2 | 12/2011 | Huang | |
| 8,224,571 B2 | 7/2012 | Huang | |
| 8,417,448 B1 | 4/2013 | Denise | |

(Continued)

FOREIGN PATENT DOCUMENTS

| | | |
|---|---|---|
| JP | 4148002 | 9/2008 |
| KR | 10-2013-0082834 | 7/2013 |

(Continued)

OTHER PUBLICATIONS

ISR and Written Opinion dated Aug. 31, 2016 in PCT/US2016/037454.
IPRP issued in PCT/US2015/048604 dated Mar. 16, 2017.

*Primary Examiner* — Ali Shayanfar
(74) *Attorney, Agent, or Firm* — Mahamedi IP Law LLP

(57) ABSTRACT

An anomaly detection system is provided in connection with a transport service. The anomaly detection system can construct routine route profiles for individual users of the transport service using historical route data. The anomaly detection system can monitor a current route traveled by a user. The anomaly detection system can further identify a matching routine route profile of the respective user. The anomaly detection system can utilize the matching routine route profile to identify a probable anomaly in the current route. In response to detecting the probable anomaly, the anomaly detection system can enable a safety protocol to perform a number of actions.

20 Claims, 7 Drawing Sheets

(56) References Cited

U.S. PATENT DOCUMENTS

| | | | |
|---|---|---|---|
| 8,417,449 B1 | 4/2013 | Denise | |
| 8,509,987 B2 | 8/2013 | Resner | |
| 8,670,930 B1 | 3/2014 | Denise | |
| 8,718,926 B1 | 5/2014 | Denise | |
| 8,762,048 B2* | 6/2014 | Kosseifi | G01C 21/3415 701/410 |
| 8,779,941 B2* | 7/2014 | Amir | G01C 21/3685 340/932.2 |
| 9,097,545 B1 | 8/2015 | Denise | |
| 9,261,376 B2* | 2/2016 | Zheng | G01C 21/3484 |
| 2004/0093280 A1* | 5/2004 | Yamaguchi | G06Q 30/0601 705/26.1 |
| 2004/0146047 A1* | 7/2004 | Turcan | H04L 29/06 370/352 |
| 2005/0258234 A1* | 11/2005 | Silverbrook | G06Q 10/087 235/379 |
| 2006/0259837 A1* | 11/2006 | Teranishi | G05B 19/0428 714/724 |
| 2007/0236366 A1* | 10/2007 | Gur | G06K 9/00 340/945 |
| 2008/0186210 A1* | 8/2008 | Tseng | G01C 21/3602 340/995.26 |
| 2011/0153629 A1 | 6/2011 | Lehmann | |
| 2012/0197416 A1* | 8/2012 | Taira | G05B 9/02 700/14 |
| 2012/0203428 A1* | 8/2012 | Choi | B60G 17/016 701/37 |
| 2012/0226391 A1* | 9/2012 | Fryer | G01C 21/3407 701/1 |
| 2013/0024060 A1* | 1/2013 | Sukkarie | H04L 67/12 701/22 |
| 2013/0063607 A1* | 3/2013 | Shimotono | H04N 5/232 348/187 |
| 2013/0073327 A1 | 3/2013 | Edelberg | |
| 2013/0147620 A1* | 6/2013 | Becker | G08B 29/126 340/514 |
| 2013/0204526 A1* | 8/2013 | Boschker | G01C 21/3484 701/533 |
| 2013/0234724 A1* | 9/2013 | Kabasawa | G08B 13/10 324/537 |
| 2013/0246301 A1* | 9/2013 | Radhakrishnan | G06Q 30/0282 705/347 |
| 2014/0082069 A1 | 3/2014 | Varoglu et al. | |
| 2014/0089202 A1* | 3/2014 | Bond | G06Q 40/02 705/71 |
| 2014/0189888 A1* | 7/2014 | Madhok | H04L 63/0807 726/29 |
| 2014/0270096 A1* | 9/2014 | Ashizuka | G08B 21/0222 379/38 |
| 2014/0322676 A1* | 10/2014 | Raman | G09B 19/167 434/65 |
| 2014/0358745 A1* | 12/2014 | Lunan | G06Q 40/12 705/30 |
| 2014/0380264 A1 | 12/2014 | Misra | |
| 2015/0033305 A1* | 1/2015 | Shear | G06F 21/45 726/6 |
| 2015/0081362 A1 | 3/2015 | Chadwick et al. | |
| 2015/0091713 A1* | 4/2015 | Kohlenberg | B60R 25/32 340/426.36 |
| 2015/0206267 A1* | 7/2015 | Khanna | G06Q 50/30 705/5 |
| 2015/0293234 A1* | 10/2015 | Snyder | G01S 19/13 342/357.59 |
| 2016/0016473 A1* | 1/2016 | Van Wiemeersch | A61B 5/6893 701/36 |

FOREIGN PATENT DOCUMENTS

| | | |
|---|---|---|
| KR | 10-2014-1452478 | 10/2014 |
| KR | 10-2015-0057165 | 5/2015 |

* cited by examiner

TRIP ANOMALY DETECTION SYSTEM

BACKGROUND

Passenger and driver safety is an ongoing concern in transportation services. Users are seeking greater and greater safety confidence for the transportations services they choose. Transportation service providers themselves are also concerned with exceeding the safety expectations of their users.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
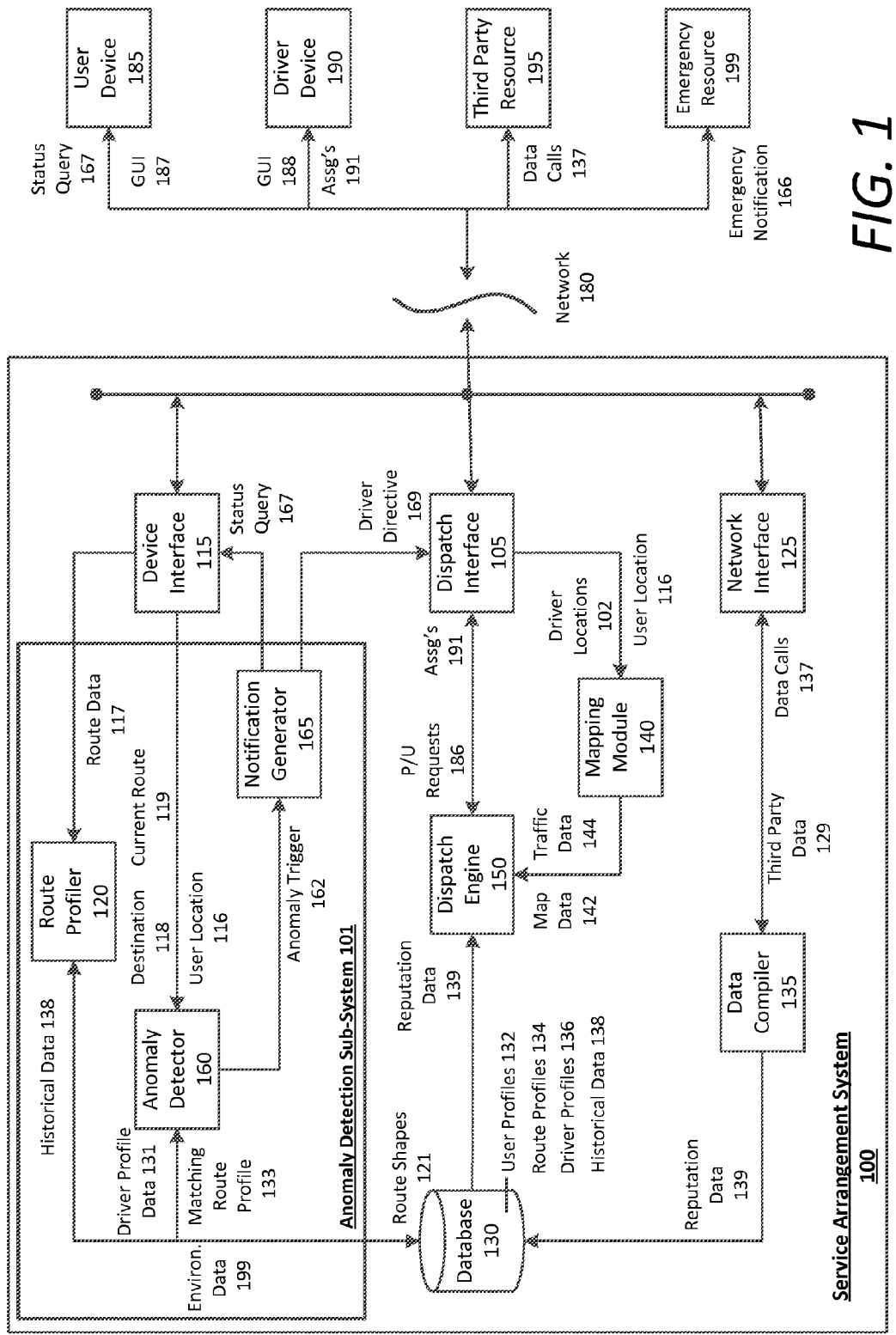
FIG. 1 is a block diagram illustrating an example system for detecting an anomaly in a current route using routine route profiles.

An anomaly detection system is provided in connection with a transport service to detect anomalies in vehicle trips using route profiles of individual users or drivers. As described herein, an anomaly refers to an action or an event that is determined to be unusual or abnormal in view of known or inferred conditions about a trip. A trip or vehicle trip, as described herein, refers to a transport service in which a rider or an object (e.g., a package) is to be transported by a driver in a vehicle. Still further, a routine route profile is a profile of a number of routes that can be taken by a user between a common start point and a common destination (e.g., a home location to a work location or vice versa, or generally, a frequently visited location to another frequently visited location), and that can indicate a routine of the user. A routine route profile can also include a common time of day. Routine route profiles may each be comprised of a single route shape, or a compilation of route shapes each representing a different route from the start point to the destination.

In some implementations, routine route profiles for users can be determined based on historical route data for individual users. As an example, a user may travel along a set route to and from work around the same time every morning and evening on weekdays. The anomaly detection system can further monitor vehicle trips of respective users in real-time by receiving location-data from mobile devices of the users and/or location-data from mobile devices of drivers that are transporting those users. Based on the routine route profiles of the respective users, the anomaly detection system can detect whether an anomaly exists or has occurred in a user's current trip to a destination. In response to detecting the anomaly in the vehicle trip, the anomaly detection system can initiate a safety protocol to perform one or more actions, such as generating and transmitting an initial status query to the mobile device of the respective user.

In certain implementations, if a response is received from the mobile device of the user that indicates a negative condition, or if no response is received for a predetermined duration of time, a notification system can automatically perform a number of emergency actions (e.g., transmit s more urgent alert, call the user's mobile device, contact emergency response authorities, contact emergency contacts, etc.). The notification system can continue to perform emergency procedures of varying degrees until a response or confirmation is received. If a response is received that indicates a positive condition, the notification system can disregard further actions and/or utilize the positive response as a data point for future reference.

Among other benefits, examples described herein achieve a technical effect of making transport services safer. Current safety standards include a number of driver initiation measures, such as mandatory driver safety or training programs and background checks. While route monitoring is possible using location-based resources, knowledge of routine route profiles for individual users can create additional safety mechanisms, or build upon current safety standards, in connection with transport services. For example, trips may be monitored for an individual user and routine route profiles for that user may be consulted in real-time to determine whether an anomaly has occurred. Various probabilistic factors may contribute to triggering a response to an anomaly in a respective trip. Such responses may include, for example, contacting the user, contacting an internal emergency service, contacting emergency authorities, etc. Examples described herein can bolster current safety nets and create new safety services in connection with on-demand transport services.

As used herein, a computing device refer to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the on-demand delivery system.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example system for detecting an anomaly in a current route using routine route profiles. A service arrangement system 100 can communicate with user devices 185 and driver devices 190 over a network 180 via, for example, the initiation and operation of designated rider and driver applications. According to an example, the service arrangement system 100 can arrange a service to be provided by a driver for a requesting user or rider. The designated rider and driver applications can each communicate with the service arrangement system 100 to exchange information in connection with transport services. For example, a rider application can display a graphical user interface (GUI) 187 on a respective user device 185 of an individual user upon the designated application being launched, enabling the user to view information about and request on-demand transport services. Furthermore, driver applications can each display a GUI 188 on respective driver devices 190 of individual drivers to match proximate drivers to users requesting transport services.

After a transport service (or trip) is arranged for a user to be provided by a driver, the service arrangement system 100 can monitor or track the progress of the trip and store data about the trip in a memory resource. Over time, the service arrangement system 100 can collect route data 117 and construct user profiles 132 for each of a plurality of users of the transport system, which may be stored in a database 130 of the service arrangement system 100. Driver profiles 136 may also be compiled by the service arrangement system 100 and can include various information concerning, for example, routes frequently traveled by the driver, driver ratings, driver reputation, complaint information, age, gender, background information, etc.

In various examples, the service arrangement system 100 can include a device interface 115 to receive route data 117 for each of any number of trips that an individual user takes using the transport service. For each trip, the driver application and/or the rider application can provide location data points (and associated time information) corresponding to the route of travel for that trip to the service arrangement system 100. For example, when a driver is providing a trip for a respective user, the driver application can access the geo-aware resources of the driver device 190 (e.g., the global positioning system (GPS) receiver) and periodically transmit the location data points corresponding to the current location of the driver (and user) to the device interface 115.

According to examples herein, the service arrangement system 100 can include an anomaly detection sub-system 101, or alternatively, can communicate with an anomaly detection sub-system 101 that detects an existence of an anomaly during a current trip. In the example of FIG. 1, the anomaly detection sub-system 101 can include a route profiler 120, which can receive the route data 117 and can compile and process the route data 117 for a user. The route profile 120 can detect route patterns for each individual user. As an example, the route data 117 can indicate certain routine route behavior indicative of a respective user traveling to and from various locations (e.g., to and from home or work at certain times during the week). As another example, the respective user may also have a specific weekend schedule and require transport services to a specified location (e.g., a church, the gym, a golf resort, a park, a restaurant, and the like). The route profiler 120 can process the route data 117 to construct route shapes 121 for a number of route profiles 134 for the respective user. Furthermore, the route profiler 120 may utilize historical data 138 stored for the respective user in the database 130 in order to further refine mappings of routine route profiles 134 for the respective user.

In many examples, the historical data 138 can include individual routes taken by the user in connection with the transport service. The historical data 138 may be user-specific, and can be stored in association with, for example, the respective user's profile 132. The route shapes 121 constructed by the route profiler 120 can also be associated with the respective user in the user profile 132. Each route shape 121 can indicate particular routes taken from a specified start point (e.g., location near the user's home) and a specified point (e.g., location near the user's work). Accordingly, the route profiler 120 can compile correlated route shapes 121 having a common start point or region (e.g., within a specified distance of the common start point) and end point or region (e.g., within a specified distance of the common end point) into a routine route profile 134 for the respective user. The route profiler 120 may compile a single routine route profile, or a plurality of routine route profiles 134 for each individual user. Such routine route profiles 134 can be associated, in the database 130, with the user profile 132 of the individual user.

According to examples described herein, the service arrangement system 100 can include dispatch engine 150 that can receive pick-up requests 186 from user devices 185 and issue invitations or assignments 191 to drivers, via a dispatch interface 105, to service the pick-up requests 186.

The service arrangement system 100 can further include a mapping module 140 that can receive the user's location 116 (e.g., the user's current location or the user's specified pick-up location in the pick-up request 186), and driver locations 102 of drivers proximate to the requesting user. The mapping module 140 can receive the user location 116 and the driver locations 102 using location-based resources (e.g., GPS resources) of the driver devices 190 and the user device 185. The mapping module 140 can provide map data 142 and/or traffic data 144, including the user location 116 and proximate driver locations 102, to the dispatch engine 150 to enable the dispatch engine 150 to select an optimal driver to service the pick-up request 186. As an alternative, the map data 142 and traffic data 144 may be received from a third party resource 195, such as a mapping service, via the network 180 over a network interface 125 of the service arrangement system 100.

In some implementations, the dispatch engine 150 can automatically select a most proximate driver (based on distance or estimated time of arrival) to the user location 116 to fulfill the pick-up request 186. In variations, in response to receiving the driver locations 102 for the proximate drivers, the dispatch engine 150 can perform a lookup, in the database 130, for the driver profiles 136 of those proximate drivers. The driver profiles 136 can contain relevant data for the dispatch engine 150 for the selection of an optimal driver. The dispatch engine 150 can further perform a lookup, in the database 130, for the user profile 132 of the requesting user. Data in both the user profile 132 of the requesting user, and the driver profiles 136 of the proximate drivers, can be compared to filter through the proximate drivers in order to select an optimal driver.

Thus, for drivers and users participating in the transport service, the user profiles 132 and the driver profiles 136 can include distinguishing information for each individual user and driver. For example, each user profile 132 and driver profile 136 can include an age, a gender, background information, an address, a name, a region, a work location, and the like. The user profiles 132 may further include information concerning user preferences for preferred drivers (e.g., a preferred driver gender), preferred routes, preferred vehicles or vehicle types (e.g., SUVs, full sized cars, hybrid vehicles, driverless vehicles, etc.), and the like. In some example, the user profiles 132 can include ratings data comprising user ratings of individual drivers or trips. The driver profiles 136 can also include ratings data comprising individual ratings and/or an overall performance rating for the driver. Additionally or alternatively, the driver profiles 136 can include complaint data, which can comprise a number of complaints against the driver (e.g., was driving too fast, had a negative disposition, was disobeying traffic laws, was insulting or harassing, etc.).

Additionally or alternatively still, the service arrangement system 100 can include a data compiler 135, which can make data calls 137 over the network 180 to third party resources 195 to receive public and/or private third party data 129 concerning a particular driver. The data compiler 135 can parse through the third party data 129 for reputation data 139 concerning the driver and insert such reputation data 139 into the driver's driver profile 136. These data calls 137 can be performed by the data compiler 135 when a driver applies or signs up for the transport service, or over the course of the driver's participation in the transport service. As an addition, the data compiler 135 can also pull third party data 129 for individual users of the transport service, and associate reputation data 139 of users with the user profiles 132 of those users. This reputation data 139, for drivers and/or users, can indicate background information relating to, for example, public service, studiousness, work ethic, former military service, former law enforcement service, family background information, and the like. However, the reputation data 139 can also indicate concerning information such as a criminal history, a violent background, an affiliation with a criminal or scandalous group, delinquent financial behavior, or a propensity towards harassment, drugs or alcohol, other irresponsible behavior, etc.

Thus, in various implementations, the dispatch engine 150 can utilize the reputation data 139 of the proximate drivers and/or the requesting user to select an optimal driver to fulfill the pick-up request 186. Additionally or alternatively, the dispatch engine 150 can utilize user data included in the user profile 132 of the requesting user to make the selection. Many factors can contribute to the dispatch engine's 150 selection of an optimal driver including, for example, the time of day or night, the gender of the proximate driver versus the requesting user, a safety factor of the location of the requesting user, reputation data 139 of the drivers and/or requesting user, etc.

When the dispatch engine 150 selects and optimal driver, the dispatch engine 150 can then send an assignment 191, via the dispatch interface 105, to the optimal driver's device to service the pick-up request 186. In some examples, the dispatch engine 150 may also send a confirmation to the requesting user device 185 indicating the approaching driver. In some implementations, provided that the driver has accepted the assignment 191, for example, once the user is picked-up, the service arrangement system 100 can provide a selectable emergency feature on the GUI 187 of the user device 185 during the trip. The selectable emergency feature can enable a user to trigger an anomaly (e.g., anomaly trigger 162) with a single or multiple selection(s) to cause the service arrangement system 100 to perform a number of actions in accordance with a safety protocol, as provided herein.

In various implementations, the service arrangement system 100 can receive the requesting user's location 116, via the device interface 115, dynamically or periodically (e.g., every four seconds)—either upon launching the designated application, upon submitting the pick-up request 186, and/or upon getting picked up by the selected driver. In one example, when the driver provides input on the driver application indicating that the user has been picked up, the driver application can periodically transmit the current location data point and/or the associated timestamp to the service arrangement system 100. In this manner, the service arrangement system 100 can continuously monitor the trip for the driver and the user.

For example, the driver or the user's location 116 can be provided to an anomaly detector 160 of the anomaly detection sub-system 101. For purpose of simplicity, the user's location 116 can correspond to both the driver and user's location (as they are both in the vehicle traveling together). In various examples, the requesting user can submit the pick-up request 186 and identify a destination location 118 prior to pick-up (e.g., with the pick-up request 186 or individually after submitting the pick-up request 186) or after pick-up by providing input on the rider application. The anomaly detector 160 can utilize the current location 116 of the user and/or the destination location 118, and, from the outset, determine whether a matching routine route profile 133 exists in the database 130. For example, the anomaly detector 160 can filter through a number of routine route profiles 134 for the requesting user. A matching routine route profile 133 may be a routine route profile 134 having a same or similar start point and destination. As such, the anomaly detector 160 can map the current location 116 of the user and the inputted destination 118 to start points and end points for each of the routine route profiles 134. If a matching routine route profile 133 does not exist, the anomaly detector 160 can monitor the trip and store route data 117 for the trip as a data point in the user's profile 132—potentially for future matches. If a matching routine route profile 133 does exist, the anomaly detector 160 can map the current route 119 traveled by the user and driver to the matching route profile 133 in real-time.

Additionally or alternatively, upon receiving a pick-up request 186 and destination 118, the anomaly detection sub-system 101 can identify a variety of possible routes between the pick-up location and the destination 118. Such routes can be compiled into a matching route profile for the trip. Accordingly, the anomaly detector 160 can utilize this matching route profile, which can include any number of possible routes, to identify potential anomalies in the trip.

In variations, a pick-up request 186 may be received from a user device 185 where the user does not identify a destination 118. In such variations, the anomaly detector 160 can identify candidate matches in the user's routine route profiles 134 based on the current location 116 of the user. As the current route 119 progresses, the anomaly detector 160 can filter through the candidate matches, or all routine route profiles 134 associated with the requesting user, to identify a matching routine route profile 133.

Utilizing the matching routine route profile 133, the anomaly detector 160 can dynamically monitor the current route 119 traveled by the user and selected driver over the course of the trip. The current route 119 may be received in real time via location-based resources on the user device 185, the driver device 190, or both. According to many examples, the anomaly detector 160 can dynamically determine whether the current route 119 strays or diverges from any number of route shapes 121 comprised in the matching routine route profile 133. If, for example, the current route 119 diverges from the matching routine route profile 133, or any of the route shapes 121 therein, beyond a certain threshold (e.g., traveling a mile outside the matching route profile 133), the anomaly detector 160 can perform an action—such as generating an anomaly trigger 162. The anomaly trigger 162 can be transmitted to a notification generator 165, which, based on a weightiness or urgency factor, can generate an appropriate notification or query for transmission.

Additionally or alternatively, the anomaly detector 160 can utilize additional information, such as driver profile data 131, to determine whether an anomaly in the trip (i.e., the current route 119) has occurred, and/or the significance of a detected anomaly in the current route 119. For example, as the anomaly detector 160 monitors the current route 119, the anomaly detector 160 can identify that the current route 119 has diverged from the matching route profile 133. The anomaly detector 160 may pull the driver profile data 131 and determine whether the selected driver has a history of complaints, a poor reputation, and/or has a propensity toward negative driver behavior. This analysis of the driver profile data 131 may occur prior to selecting the driver, or can be triggered by a detected anomaly in the current route 119. According to some examples, the anomaly detector 160 can set a lower anomaly threshold when the driver profile data 131 indicates any such adverse behavioral characteristics. Additionally or alternatively, the anomaly detector 131 can set a higher anomaly threshold when the driver profile data 131 indicates more preferred behavioral characteristics.

The anomaly detector 160 may further factor in external data, such as traffic data 144 and map data 143. Thus, when a divergence or anomalous activity is detected in the current route 119, the anomaly detector 160 can determine whether traffic conditions are a potential cause (e.g., avoiding event traffic or an auto accident). Thus, if the traffic data 144 indicates heavy traffic along the route shapes 121 for the matching route profile 133, the anomaly detector 160 may determine that the cause of the divergence in the current route 119 is the avoidance of traffic. Accordingly, the anomaly detector 160 can set a higher anomaly threshold for this detected divergence.

In many examples, the anomaly detector 160 can further generate an anomaly trigger 162 when abnormal behavior is detected in the current route 119 even if the current route 119 does not diverge from the matching route profile 133. As such, the anomaly detector 160 can utilize environmental data 199 for a particular location or region to raise or lower the threshold for triggering an anomaly. The environmental data 199 can be pulled from a third party resource 195 via the network interface 125, and/or stored in the database 130 as historical data 138. As an example, the service arrangement system 100 can parse through data from third party resources 195, such as police report data or local news and crime data, and flag certain locations or regions as areas of concern. Such areas of concern may include high crime neighborhoods, parking lots or garages, tunnels, alleyways, cul-de-sacs, etc. According to some examples, the anomaly detector 160 may lower the anomaly threshold whenever the current route 119 enters or flanks a flagged area of concern. Certain areas of high concern (e.g., parking garages) may automatically trigger a notification. For example, if the current route 119 enters a concerning parking garage, the notification generator 165 can automatically transmit a status query 167 to the user device 185. If a positive response is received, the anomaly detector 160 can identify the area of high concern (in this case, the concerning parking garage) as a positive data point, and therefore raise the anomaly threshold for that particular user at that particular location. However, if a negative response is received, or no response is received, the notification generator 165 can lower the anomaly threshold and/or perform a number of elevated actions, as described in detail below.

Abnormal behavior in the current route 119 may further include the vehicle remaining static for a period of time. Traffic data 144 may be utilized by the anomaly detector 160 to identify whether traffic may be the cause. Additionally or alternatively, the anomaly detector 160 may utilize map data 142 or third party data 129 to determine whether a stop has been made. For example, the anomaly detector 160 may identify that a stop has occurred in the current route 119 at a permissive location, such as a gas station or coffee shop. In response, the anomaly detector 160 can raise the anomaly threshold for generating and transmitting a notification.

In various implementations, when an anomaly is detected, the anomaly detector 160 can calculate several factors to determine whether the anomaly threshold has been met. As described herein, the anomaly threshold may set higher or lower depending on factors such as route divergence, driver profile data 131, flagged locations or areas, static activity, traffic data 144, third party data 129, and the like. Once the anomaly threshold is met, the anomaly detector 160 can generate an anomaly trigger 162, which can identify a variable degree of urgency or seriousness in the detected anomaly. The anomaly trigger 162 can be received by the notification generator, which can transmit an appropriate notification in light of the anomaly trigger 162.

For example, the anomaly detector 160 may identify a divergence in the current route 119 from the matching route profile 133 (e.g., a one mile divergence), and cause the anomaly detection system to perform one or more actions in accordance with a safety protocol. For example, and initial action of the safety protocol can correspond to the notification generator 165 transmitting a basic status query 167 to the user device 185 via the device interface 115. The status query 167 can prompt the user to respond positively or negatively within a predetermined time. The status query 167 may be a push notification or in-application message on the user's mobile computing device (e.g., the user device 185), or a text message, such as an SMS or email to the user device 185. For example, if the designated application—specific to the transport service—is currently launched on the user device 185, the status query may be a push notification on the display. The push notification can be transmitted to the rider application, which can cause the rider application to display content (e.g., asking about the user's safety status) and/or output an audio alert or cause the user device 185 to vibrate to get the user's attention. Additionally or alternatively, even if the designated application is not currently launched on the user device 185, the notification generator 165 can configure the status query 167 to penetrate a number of application layers of the user device 185 to present (visually and/or audibly) the status query 167 to the user.

In many examples, if a positive response to the status query 167 is received via user input on the GUI 187 of the rider application or via a reply to a message, the anomaly detector 160 can record the positive response in the user's user profile 132 and/or add an additional route shape 121 to the matching route profile 133 based on the current route 199 traveled. As described herein, a positive response can correspond to the user indicating that he or she is safe and that nothing is wrong. However, if a negative response to the status query 167 is received or if no response is received within a predetermined duration of time (e.g., 1 minute), the service arrangement system 100 can perform additional safety operations in accordance with the safety protocol. For example, based on the negative response, the notification generator 165 can generate and transmit a driver directive 169 to the selected driver's device 190 via the dispatch interface 105. The driver directive 169 may also be a push notification which can task the driver to perform a number of actions. For example, the driver directive 196 can prompt the driver for a status update. In such examples, a potential false positive anomaly may be cured by way of internal communication between the driver and user, which may result in the user submitting a positive response to the status query 167. This response may trigger additional queries, such as an inquiry into the reason for divergence (e.g., a selectable list). Alternatively, the driver directive 169 may prompt the driver to travel to the destination 118 or a safe location (e.g., a police station).

Based on a seriousness or urgency in the detected anomaly, the anomaly detector 160 can vary the anomaly trigger 162 accordingly. For example, more serious anomalies can cause the notification generator 165 to generate and transmit an emergency notification 166 to an emergency resource 199. As an example, if the anomaly detector 160 determines, using the driver profile data 131, that the selected driver has a propensity towards misconduct, and an anomaly is detected in the current route 119, the notification generator 165 can generate and transmit a warning to the driver device 190 in conjunction with the status query 167 to the user device 185. If the responses to the warning and status query 167 are not consistent or are not positive, the notification generator 165 can transmit the emergency notification 166 to the emergency resource 199. As provided herein, the emergency resource 199 may be an internal resource, such as a monitoring service. Additionally or alternatively, the emergency resource 199 can be emergency contacts preconfigured by the user, or police services.

In some examples, if no response is received to the status query 167, the notification generator 165 can perform a number of responsive actions. For example, after a predetermined period (e.g., two minutes), the notification generator 165 can configure an alert notification for transmission to the user device 185, where the alert notification can have more urgency in presentation and/or sound. Additionally or alternatively, the notification generator 165 can transmit an alert to the driver device 190 via the dispatch interface 105. Such alerts may be transmitted periodically until a response is received from the user. If no response is received, the anomaly detector 160 initiate further actions of the safety protocol as described above.

Methodology

Figure 2:
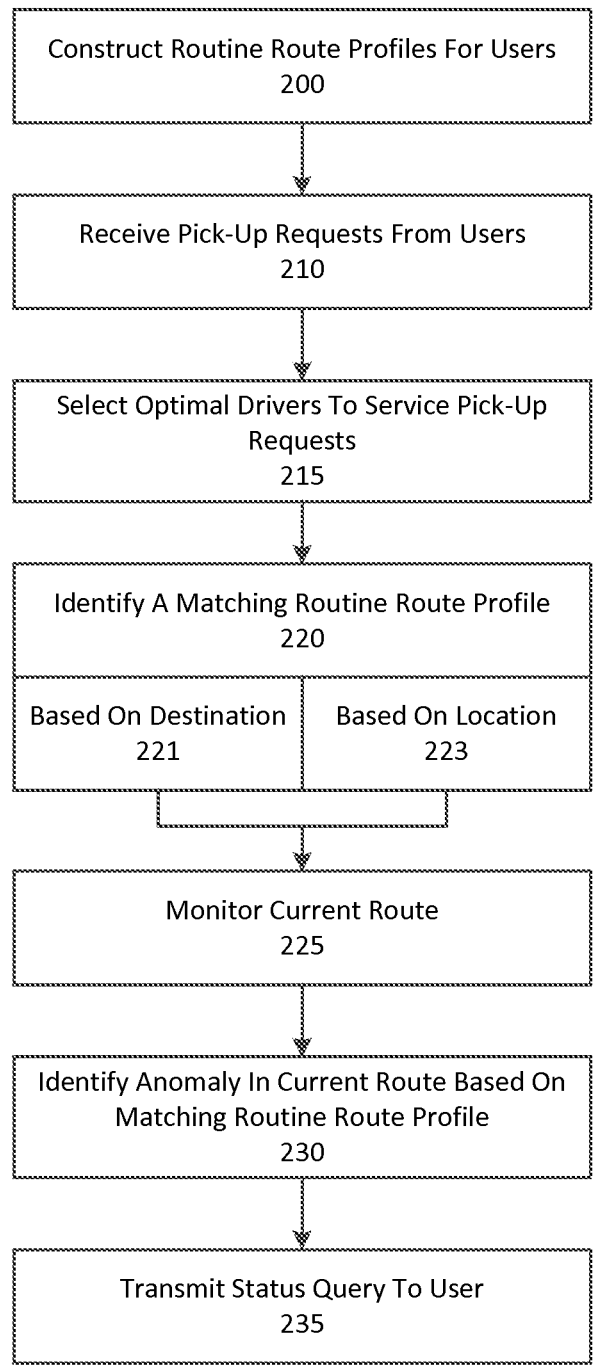
FIG. 2 is a high level flow chart illustrating an example method of detecting an anomaly in a current route using routine route profiles.

FIG. 2 is a high level flow chart illustrating an example method of detecting an anomaly in a current route using routine route profiles. In the below description of FIG. 2, reference may be made to like reference characters representing various features of FIG. 1 for illustrative purposes. Furthermore, the high level method described in connection with FIG. 2 may be performed by an example service arrangement system 100 as illustrated in FIG. 1. Referring to FIG. 2, a route profiler 120 of the service arrangement system 100 can construct routine route profiles 134 for a number of users of the transport service (200). The routine route profiles 134 can be comprised of a number of route shapes 121 indicating different routes between a start point and a destination routinely traveled by the user. The dispatch engine 150 of the service arrangement system 100 can receive pick-up requests 186 from user devices 185 (210). In many examples, the pick-up requests 186 can include a destination 118. Additionally or alternatively, the destination 118 can be specified prior to pick-up or en route to the destination 118. In response to the pick-up request 186, the dispatch engine 150 can select an optimal driver from a plurality of proximate drivers to service the pick-up request 186 (215). Prior to or after pick-up, the anomaly detector 160 can identify the destination 118 and start point and filter through a number of routine route profiles 134 of the requesting user. From the routine route profiles 134 the anomaly detector 160 can identify a matching route profile 133 (220).

In certain implementations, the matching route profile 133 can be identified based on the destination 118 identified by the user (221), the current location 116 of the user and the driver while on the trip (223), or both. After pick-up, the anomaly detector 160 can monitor the current route 119 to the destination 118 (225). In one example, the anomaly detector 160 can monitor the current route 225 once the user has been picked up by the driver (e.g., before step 220). During the trip, the anomaly detector 160 can detect an anomaly in the current route 119 in light of the matching route profile 133 (230). For example, the anomaly may be a divergence between the current route 119 and the matching route profile 133. If the anomaly exceeds a certain threshold (e.g., a divergence of more than one mile), the service arrangement system 100 can initiate a safety protocol and transmit a status query 167 to the user device 185 (235). The status query 167 can prompt the user for a positive or negative response, where the service arrangement system 100 can perform an appropriate action based on the response.

Figure 3A:
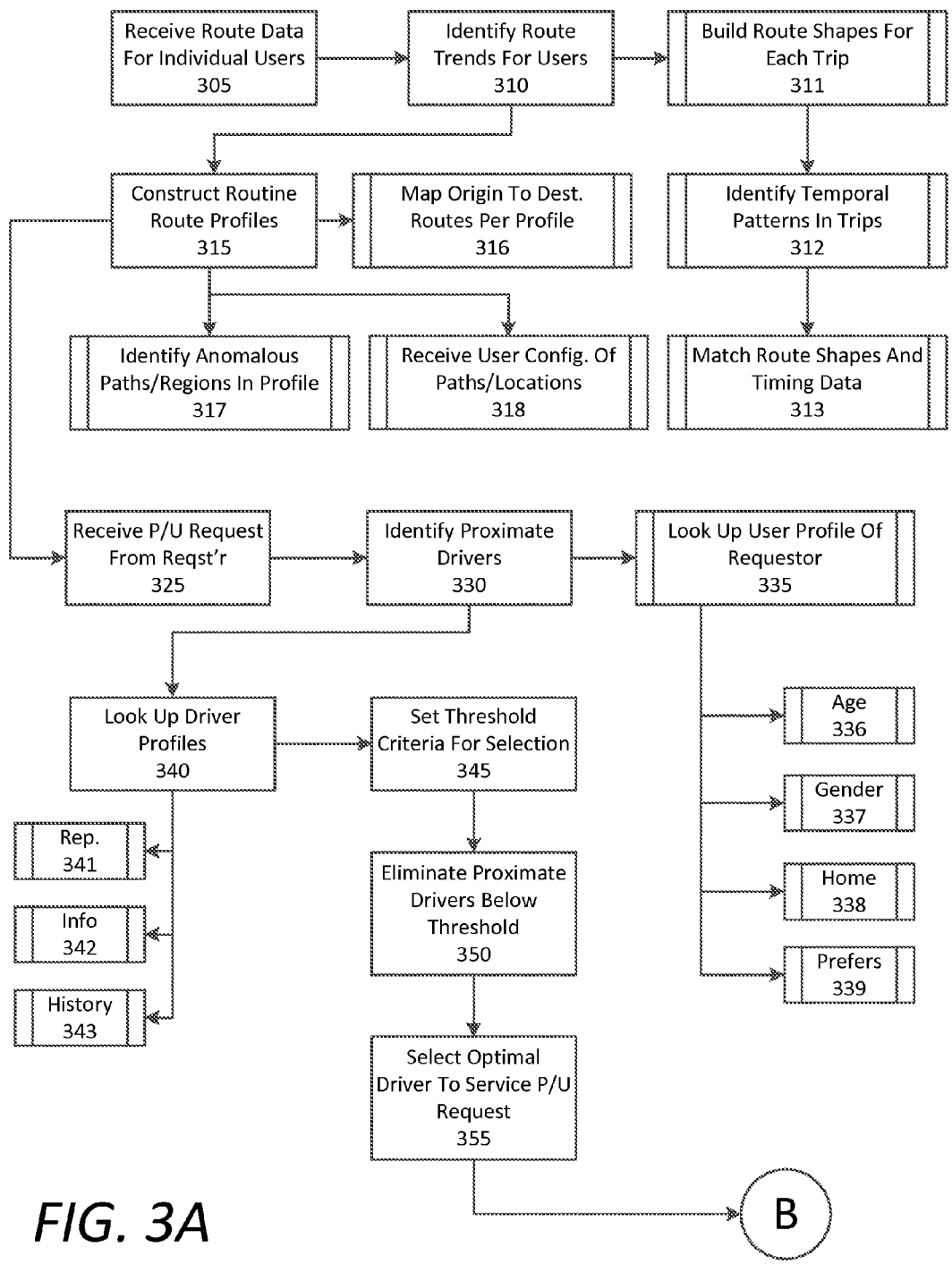
FIG. 3A is a low level flow chart illustrating an example method of profiling routes for individual users and selecting optimal drivers to service pick-up requests.

FIG. 3A is a low level flow chart illustrating an example method of profiling routes for individual users and selecting optimal drivers to service pick-up requests. The low level method described in connection with FIG. 3A may be performed by an example route profiler 120 and dispatch engine 150 of the service arrangement system 100 as described in connection with FIG. 1. Referring to FIG. 3A, the route profiler 120 can generally receive route data 117 from a number of individual user devices and/or driver devices (305). The route profiler 120 can further identify route trends or routines using historical data 138 for each of the users (310). For example, the route profiler 120 can build route shapes 121 for each trip to map a routine route profile 134 for a user (311). Furthermore, the route profiler 120 may identify temporal patterns for the user's routine trips (e.g., routine travel times to and from work) (312). In some examples, the route profiler 160 can match route shapes 121, or the routine route profile 134 itself, to timing data for the trips (313). For example, a route profile 134 from the user's home to work can be associated with a typical time range (e.g., 5:45 am to 6:15 am). Along these lines, a similar route profile 134 from the user's work to home can also be associated with a typical time range (e.g., 5:00 pm to 5:30 pm).

Accordingly, the route profiler 120 can construct routine route profiles 134 for individual users to be stored in the database 130 (315). Such routine route profiles 134 may be associated with a user profile 132 of a respective user. Each routine route profile 134 can comprise a number of route shapes 121 that map a common origin, or start point, to a common destination 118 (316). In some examples, the user can be enabled to configure no-travel zones on the routine route profiles 134, for example, if the route profile 134 flanks a dangerous neighborhood or other area of concern (318). In variations, the route profiler 120 can preemptively identify anomalous paths, locations, or regions in the routine route profile 134 based on third party data 129 (317). Additionally or alternatively, the route profiler 120 can enable the user to set authorized routes for a particular route profile 134.

The dispatch engine 150 of the service arrangement system 100 can receive pick-up requests 186 from a requesting user's device 185 (325). Upon launch of the designated application, or when the requesting user submits the pick-up request 186, the dispatch engine 150 can identify proximate drivers to the requesting user (330). In some examples, the dispatch engine 150 can automatically select the most proximate driver (by distance or time) to service the pick-up request 186. In other examples, the dispatch engine 150 can perform a filtering process to select an optimal driver. For example, upon receiving the pick-up request 186, the dispatch engine 150 can look up the user profile 132 of the requestor (335). The requestor's user profile 132 can identify certain user data, such as the requestor's age (336), gender (337), home address (338), and preferences (339). The user preferences may indicate preferred constraints for the driver selection, such as a preferred type or size of car or van, a preferred gender or age range for the driver, a preferred rating for the driver (e.g., five star rated drivers only), a preference for driverless cars, and the like. The user data in the requestor's user profile 132 can include further information, such demographic data, background data, family status, emergency contact information, etc.

In various implementations, the dispatch engine 150 can perform a lookup of driver profiles 136 for the proximate drivers prior to selection. Each of the driver profiles 136 can include driver profile data 131 comprising a driver history with the transport service (343). The driver history can include individual and overall performance ratings from users (e.g., 4.5 stars overall), driver reviews, complaint history, accident history, etc. The driver profile data 131 can also include the proximate driver's personal information (342), such as the driver's age, gender, type of car, other demography, home address, and the like. The driver profile data 131 can further include reputation data 139 (341), which can be pulled from external, third party resources 195. As discussed above, the reputation data 139 can be indicative of desirable or undesirable behavioral characteristics of the driver.

The dispatch engine 150 can set threshold criteria or standards for the driver selection based on a number of factors from the driver profiles 136 and/or the user profile 132 (345). The threshold criteria may be based on the requesting user's age, a time of day, the user's location, the user's gender, and/or the user's preferences. As an example, if the requesting user is a 15 year old girl, the time is 11:00 pm, and her current location is in a dangerous area, the dispatch engine 150 may set a high standard for the driver selection (e.g., only highly reputable drivers with minor or no complaints and preferably female). As another example, if the requesting user is a 35 year old male, the time is 4:00 pm, and his current location is in a safe area, the dispatch engine 150 can set a low standard for the driver selection (e.g., any closest proximate driver). The threshold criteria may also include user preferences of the requestor. For example, all else being equal, if the user preferences indicate that the requesting user prefers hybrid electric cars, the dispatch engine 150 can filter out the proximate drivers that are not operating hybrid electric cars.

Each of the threshold criteria may be weighted based on importance with regard to safety. Thus, based on the threshold criteria and factors (e.g., driver reputation, user preferences, time of day, location), the dispatch engine 150 can eliminate proximate drivers that do not meet a minimum threshold (350). Of the remaining drivers, the dispatch engine 150 can select an optimal driver to service the pick-up request 186 (355). This optimal driver may be selected from the remaining drivers based on closest proximity, reputation, meeting one or more of the requesting user's preferences, etc. Once the optimal driver is selected, the method as discussed with respect to FIG. 3A can progress to B—representing the flow chart provided in FIG. 3B.

Figure 3B:
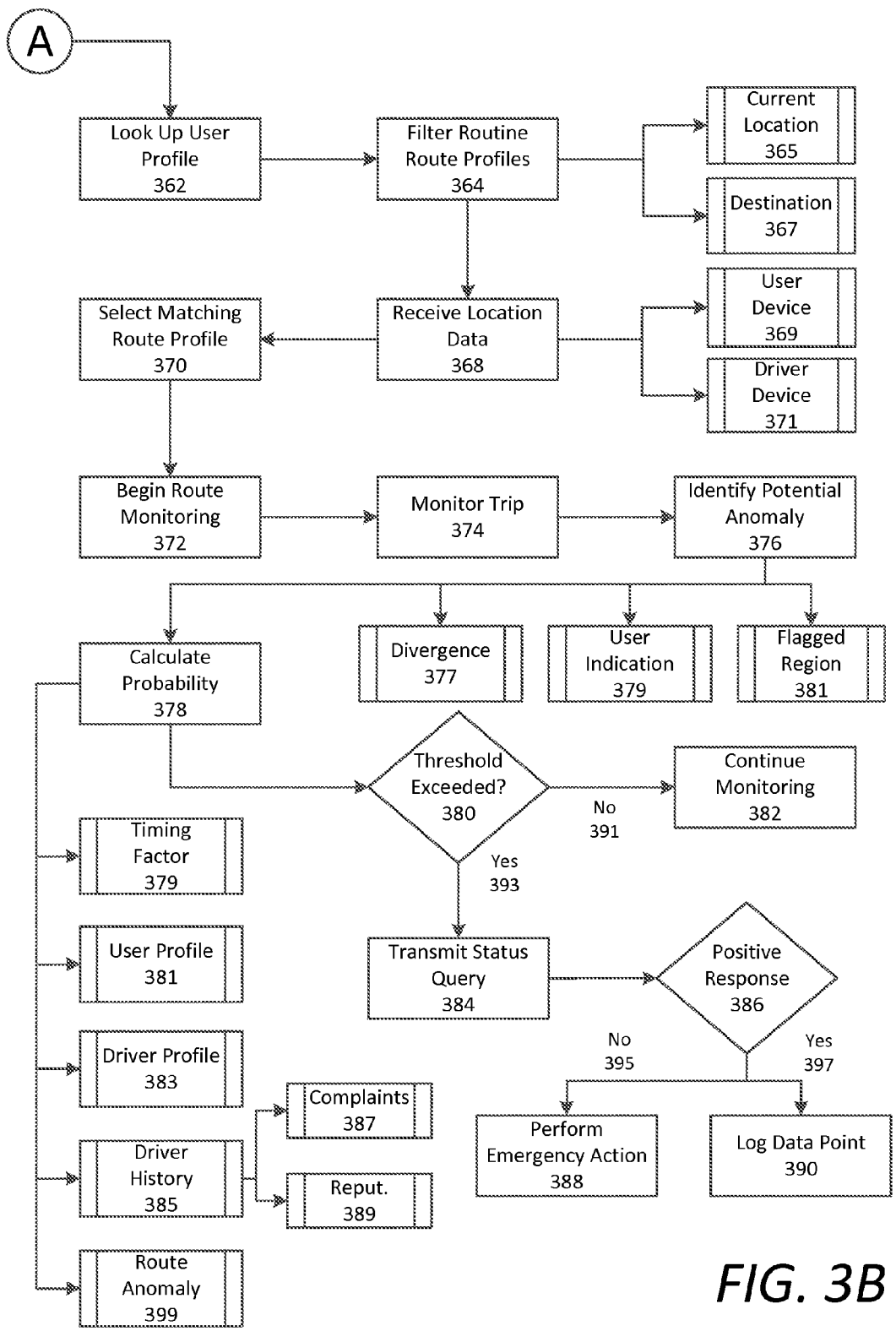
FIG. 3B is a low level flow chart illustrating an example method of detecting anomalies in current routes and responding to such anomalies.

FIG. 3B is a low level flow chart illustrating an example method of detecting anomalies in current routes and responding to such anomalies. The low level method described in connection with FIG. 3B may be performed by an example anomaly detector 160 of the service arrangement system 100 as described in connection with FIG. 1. Referring to FIG. 3A, from the flow chart description of FIG. 3A—represented by A, an optimal driver is selected and can pick up the requesting user at the user's current location 116. According to examples described herein, the anomaly detector 160 can look up the user profile 132 of the requesting user (362). Based on the current location 116 (365) of the requesting user, and the destination 118 (367), the anomaly detector 160 can filter through a number of routine route profiles 134 of the requesting user (i.e., the passenger or rider) (364). Alternatively, for an unspecified destination, the anomaly detector 160 can utilize the start location as a preliminary filter to identify one or more candidate routine route profiles. As the trip progresses, the anomaly detector 160 can narrow the route profiles 134 until a matching profile 133 is identified.

The anomaly detector 160 can receive location data (368) from the user device 185 (369), the selected driver's device 190 (371), or both. Based on the specified destination 118 and the user's current location 116, the anomaly detector 160 can select a matching route profile 133 with the same or similar start point and end point (370). The anomaly detector 160 can utilized this matching route profile 133—which can include a number of route shapes 121 indicative of different routes traveled by the user between the start point and end point—to compare with a current route 119 traveled by the user. When the user is picked up by the selected driver, the anomaly detector 160 can begin monitoring the current route 119 (372).

In some implementations, the anomaly detector can initially monitor the trip by comparing the current route 119 traveled by the respective user to a route input, by the optimal driver, into a mapping resource of a mobile device (e.g., the driver device 190) of the optimal driver. The current route 119 monitoring can be based on location data received, continuously or periodically, from the user device 185 or the driver device 190. Additionally or alternatively, the anomaly detector 160 can utilize traffic data 144 and/or map data 144 to monitor the current route 119, which can indicate a cause for a potential anomaly. Furthermore, the anomaly detector 160 can utilize configurations in the matching route profile 133 to monitor the current route 119. As an example, the anomaly detector 160 can make a note of no-travel zones, auto accidents, event traffic, etc.—which may be indicated by the user, a third party resource 195, or the driver. The anomaly detector 160 may further overlay or input such areas onto a dynamic travel map, which may be transmitted to the user device 185 and/or the driver device 190.

The anomaly detector 160 can similarly dynamically monitor the trip itself in relation to the matching route profile 133 (374). During the trip, the anomaly detector 160 can identify a potential anomaly (376), such as a divergence between the matching route profile 133 and the current route 119 (377), a user indicating an anomaly via the GUI 187 on the user device 185 (379), and/or the current route 119 entering or flanking a flagged location or area (381). In order to meet an anomaly threshold to trigger the notification generator 165 in order to transmit a notification, the anomaly detector 160 can calculate a probability, in real-time, for a potential emergency (378). The weighted factors for the calculation can include a timing factor (379) indicative of a time of day (e.g., late night hours may be weighted higher than afternoon hours), user data in the user's profile 132 (381), driver profile data 131 in the driver's profile 136 (383), and/or driver history (385)—which can include complaint history (387) and/or reputation data 139 (389) for the driver. Such reputation data 139 can include indicators pertaining to the selected driver's behavioral propensity. Furthermore, the anomaly detector 160 can calculate a reputation score for the driver based on a collection of relevant reputation data 139. The reputation score may be utilized in selecting the driver and/or comparing the driver data to the user profile data in determining a seriousness of a detected anomaly. The weighted factors can further include a detected route anomaly (399), such as abnormal route behavior, divergence in the route, entrance into a flagged area, etc. These route anomalies (399) can be weighted factors, and can also comprise trigger factors for the probability calculation.

Based on such weighted factors, the anomaly detector 160 can calculate or otherwise determine whether an anomaly threshold has been exceeded (380) based on the collective probability factors. Each of the weighted factors may be attributed a value. For example, a disreputable driver factor may be weighted much more heavily than a time of day factor, where the time of day is in the early afternoon. As another example, a route anomaly factor where the current route 119 enters a parking garage may be heavily weighted in relation to a mediocre driver rating. Accordingly, if the anomaly threshold is not exceeded (391), the anomaly detector 160 continues monitoring the trip (382). If, however, the anomaly threshold is exceeded (393), then the anomaly detection sub-system 101 can perform a number of actions based on a seriousness of the anomaly. For example, if the anomaly threshold is barely exceeded, or otherwise exceeded below a second threshold, the anomaly detection sub-system 101 can generate a status query 167 for transmission to the user (384). However, if the anomaly threshold is significantly exceeded, the anomaly detection sub-system 101 can perform an emergency action (388), such as contacting authorities and/or emergency contacts.

The anomaly detection sub-system 101 may receive a response to the status query 167, and determine whether the response is positive or negative (386). As provided herein, a positive response may be a response indicating that the user is okay and that the detected anomaly is authorized. For positive responses (397), the anomaly detection sub-system 101 can record the anomaly as a data point for future activity (390). As provided herein, a negative response may be a response indicating that the user is in trouble and requires assistance or support. For negative responses (395), the anomaly detection sub-system 101 can perform an emergency action (388), such as submitting an additional query to the user device 185 prompting the user for additional information, contacting internal or external authorities, contacting emergency contacts, and the like.

Screenshot Examples

Figure 4A:
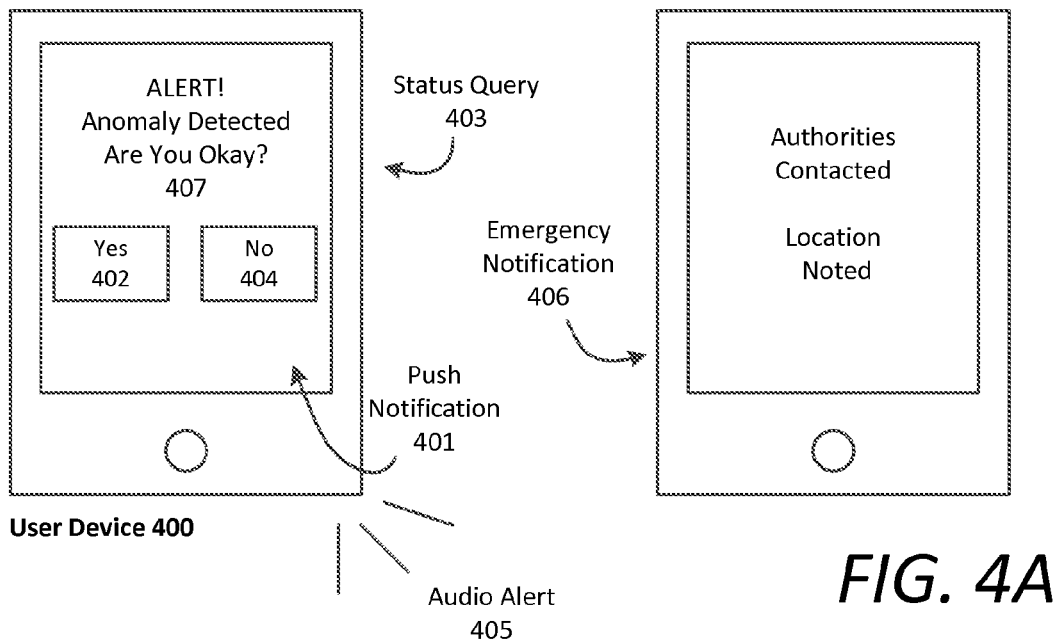
FIGS. 4A and 4B illustrate example screenshots of status queries and emergency notifications provided by the anomaly detection system.
Figure 4B:
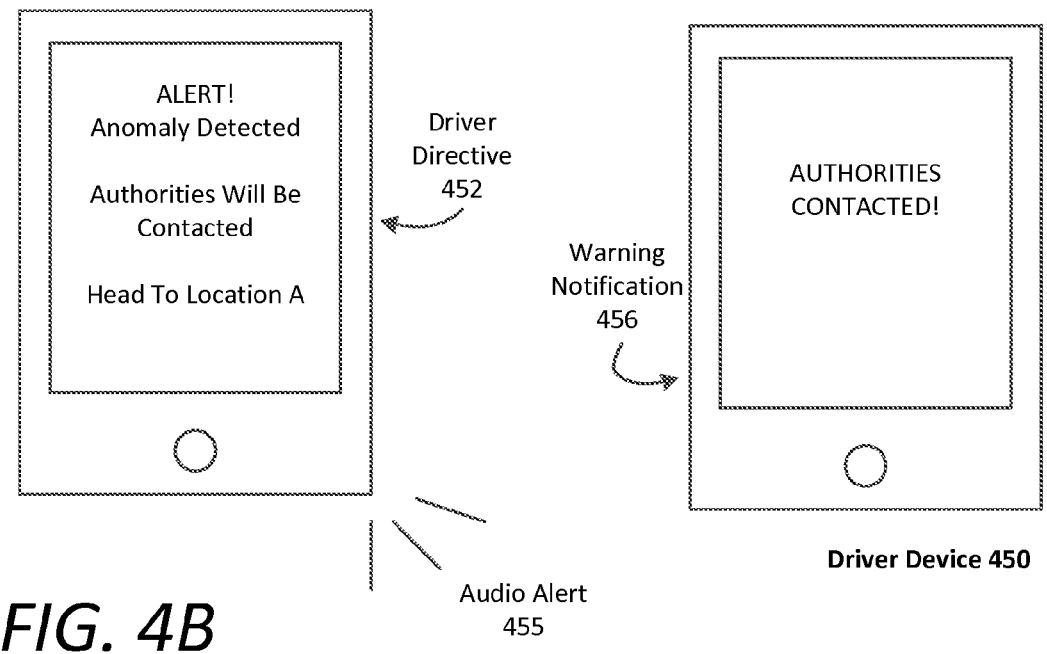

FIGS. 4A-4B illustrate example screenshots of status queries and emergency notifications provided by the anomaly detection system. As provided in FIG. 4A, based on a detected anomaly exceeding an anomaly threshold, the anomaly detection sub-system 101 can transmit a status query 403 to the user device 400 of the rider. The status query 403 may be configured such that upon receipt, the user device 400 instigates an audio alert 405 along with a push notification 401. The push notification 401 may be transmitted as a selectable icon on the GUI of the user device 400, or can be configured as a graphical alert generated on the user device 400, as shown in FIG. 4A. The status query 403 can include a message 407 (e.g., "ARE YOU OKAY?") prompting the user to respond. The user prompt can include a pair of selectable features (e.g., "YES" 402 and "NO" 404) that the user can select in response to the message.

If no response is received, or if a negative response is received, the anomaly detection sub-system 101 can contact authorities and transmit an emergency notification 406 to the user device 400. Additionally or alternatively, the anomaly detection sub-system 101 can transmit an additional query configured to be presented in a more urgent manner on the user device 400.

FIG. 4B illustrates an example driver directive 452 which the anomaly detection sub-system 101 can transmit to the driver device 450 if a negative response, or no response, is received from the user device 400. The driver directive 452 can prompt the driver to pull over and submit an explanation, request that the driver head to a safe location, and/or otherwise warn the driver that authorities will be contacted in response to a failure to comply. The driver directive 452 may further be presented on the driver device 450 in conjunction with an audio alert 455 so that both the user and driver may be alerted to the detection of the anomaly. If the driver does not respond, and the anomalous behavior continues, the anomaly detection sub-system 101 can contact authorities, and a corresponding warning notification 456 can be transmitted to the driver device 450.

Hardware Diagrams

Figure 5:
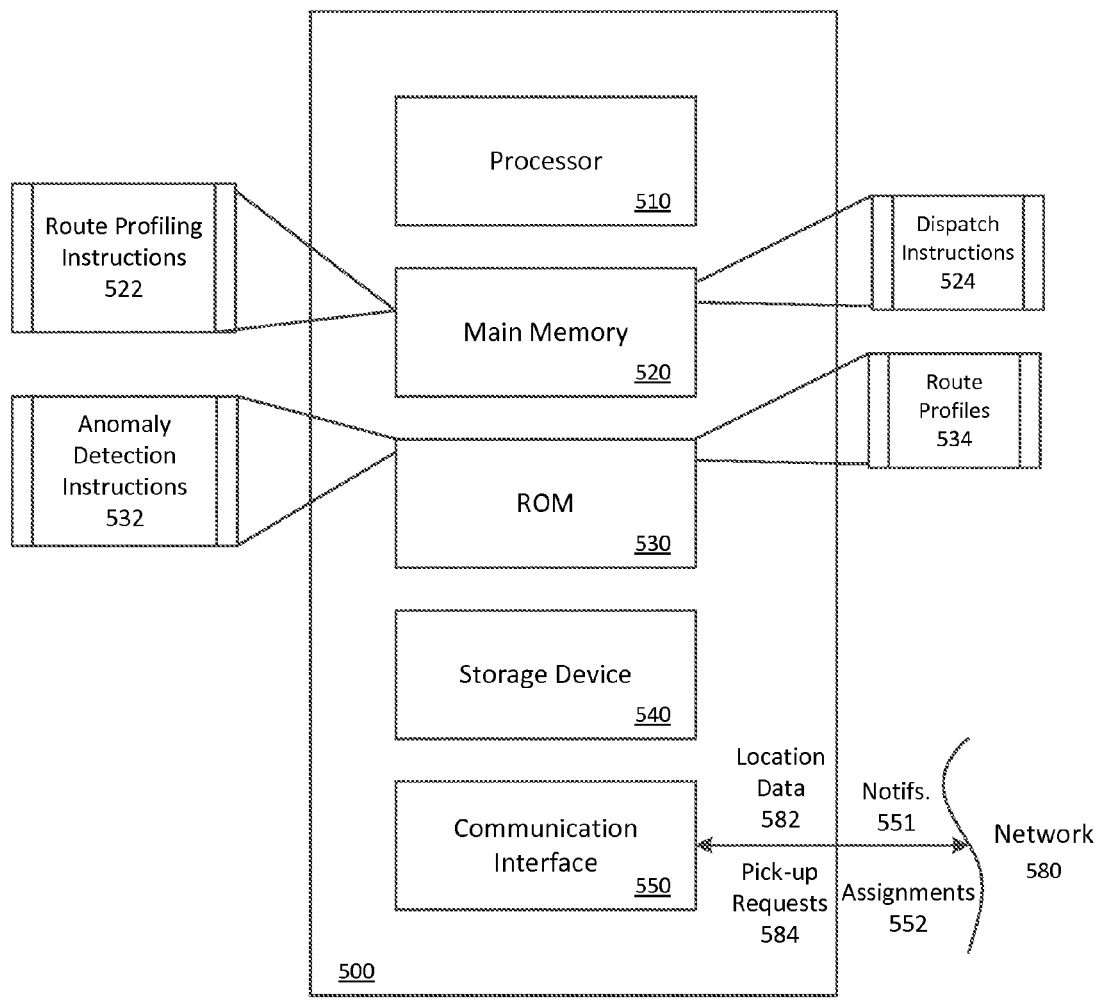
FIG. 5 is a block diagram illustrating a computer system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service for providing transportation services. In the context of FIG. 1, the service arrangement system 100 may be implemented using a computer system such as described by FIG. 5. The service arrangement system 100 may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., cellular network) through use of the network link (wireless or a wire). Using the network link, the computer system 500 can communicate with one or more computing devices, and one or more servers. In accordance with examples, the computer system 500 receives location data 582 and pick-up requests 584 from mobile computing devices of individual users. The executable instructions stored in the memory 520 can include route profiling instructions 522, which the processor 510 executes to construct routine route profiles for individual users. The executable instructions stored in the memory 520 can also include dispatch instructions 524, which enable the computer system 500 to select an optimal driver to service a respective pick-up request 584. The executable instructions stored in the memory 530 can include anomaly detection instructions 532 to monitor a current route in relation to a matching routine route profile, and detect anomalies in the current route. The memory 530 can include routine route profiles 534 for individual users in, for example, user profiles of those users. By way of example, the instructions and data stored in the memory 530 can be executed by the processor 510 to implement an example service arrangement system 100 of FIG. 1. In performing the operations, the processor 510 can generate and send notifications 551 via the communication interface 550 to the mobile computing devices of the users and drivers.

The processor 510 is configured with software and/or other logic to perform one or more processes, steps and other functions described with implementations, such as described by FIGS. 1 through 3, and elsewhere in the present application.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
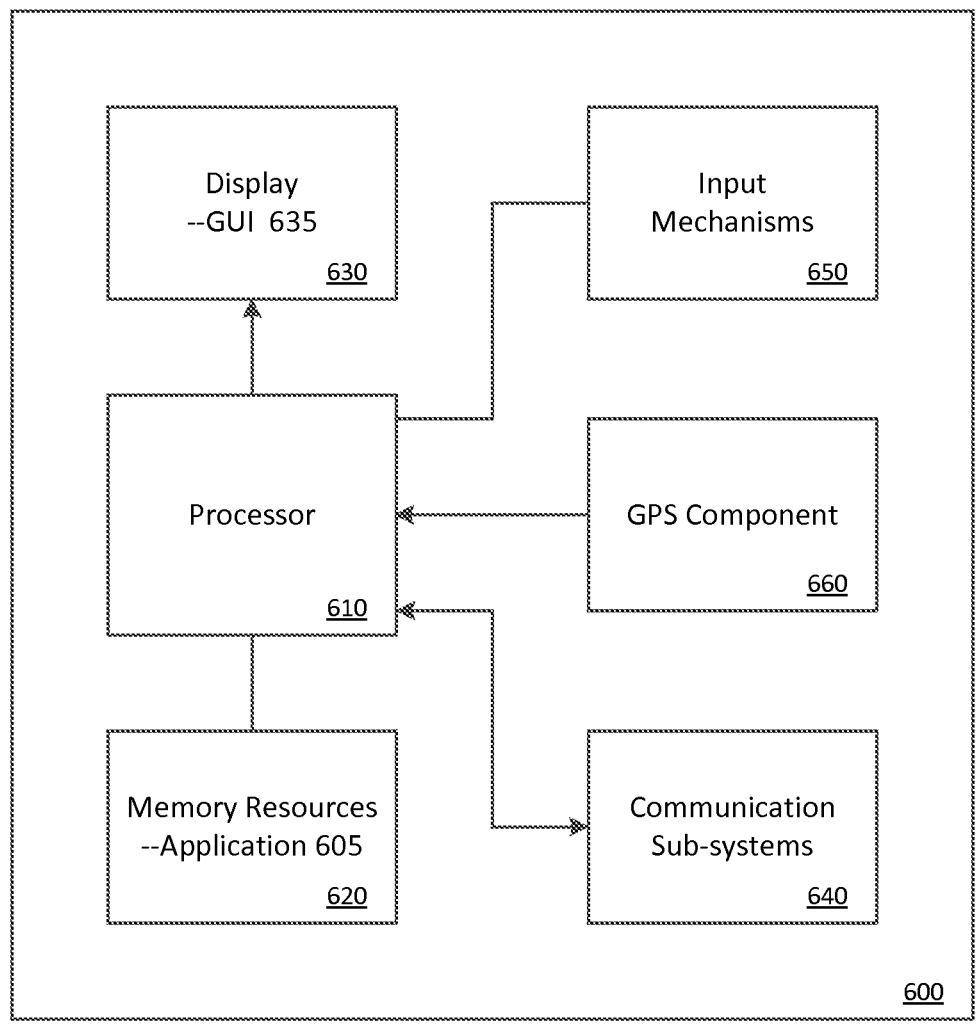
FIG. 6 is a block diagram illustrating a mobile computing device upon which examples described herein may be implemented.

FIG. 6 is a block diagram that illustrates a mobile computing device upon which examples described herein may be implemented. In one example, a mobile computing device 600 may correspond to, for example, a cellular communication device (e.g., feature phone, smartphone etc.) that is capable of telephony, messaging, and/or data services. In variations, the mobile computing device 600 can correspond to, for example, a tablet or wearable computing device. Still further, the mobile computing device 600 can be distributed amongst multiple portable devices of drivers, and requesting users.

In an example of FIG. 6, the computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

A driver of a transport vehicle can operate the mobile computing device 600 when on a shift to provide transportation services. The memory resources 620 can store one or more applications 605 for linking the mobile computing device 600 with a network service that enables or otherwise facilitates the drivers' and users' ability to efficiently request transport services and service those pick-up requests. Execution of the one or more applications 605 by the processor 610 may cause a specified graphical user interface (GUI) 635 to be generated on the display 630. Interaction with a driver GUI 635 can enable drivers of transport vehicles to receive assignments to service pick-up requests or perform a pickup and/or drop-off. Further still, a user can operate the mobile computing device 600 to communicate with the service arrangement system 100. Interaction with a requestor GUI can enable requesting users to request a pick-up for transportation service to a selected destination using a rider application stored in the memory resources 620. As described herein, the rider application can display a GUI 635 corresponding to the status query illustrated in FIG. 4A.

While examples of FIG. 5 and FIG. 6 provide for a computer system 600 and mobile computing device 600 for implementing aspects described, in some variations, the mobile computing device 600 can operate to implement some or all of the functionality described with the service arrangement system 100.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An anomaly detection system for a transport service comprising:
   one or more processors; and
   one or more memory resources storing instructions that, when executed by the one or more processors, cause the anomaly detection system to:
      construct routine route profiles for users of the transport service by, for each of the users, (i) collecting historical route data, and (ii) identifying correlated route shapes in the historical route data;
      monitor a current route traveled by a respective one of the users;
      identify a matching routine route profile of the respective user;
      based on the matching routine route profile, determine a probable anomaly in the current route by performing a real-time probabilistic calculation and determining that a number of probability factors collectively exceed an anomaly threshold; and
      in response to determining the probable anomaly, perform one or more actions in accordance with a safety protocol, including transmitting a status query to a mobile device of the respective user or contacting an emergency authority to report the probable anomaly.

2. The anomaly detection system of claim 1, wherein the executed instructions further cause the anomaly detection system to, prior to monitoring the current route:
   receive a pick-up request from the respective user; and
   select a driver to service the pick-up request.

3. The anomaly detection system of claim 2, wherein the pick-up request includes a destination, and wherein the executed instructions further cause the anomaly detection system to:
   identify the matching routine route profile prior to monitoring the current route, and based on an initial location of the respective user and the destination.

4. The anomaly detection system of claim 2, wherein the probability factors comprise (i) a divergence factor between the matching routine route profile and the current route, and (ii) a reputation factor of the selected driver.

5. The anomaly detection system of claim 4, wherein the reputation factor of the selected driver comprises (i) a complaint history of the selected driver, and (ii) reputation indicators of the selected driver received or retrieved from third-party resources.

6. The anomaly detection system of claim 2, wherein the executed instructions cause the anomaly detection system to select the driver based on (i) a proximity between the respective user and the selected driver, and (ii) data from a user profile of the respective user and data from a driver profile of the selected driver, the driver profile comprising reputation data.

7. The anomaly detection system of claim 6, wherein the executed instructions cause the anomaly detection system to select the driver based, at least in part, on (i) one or more factors for the respective user comprising one or more of an age, a gender, or user preferences in the user profile, and (ii) a reputation score for the selected driver based on the reputation data in the driver profile of the selected driver.

8. The anomaly detection system of claim 1, wherein the executed instructions cause the anomaly detection system to identify the matching routine route profile while the current route is being traveled by the user.

9. The anomaly detection system of claim 1, wherein the probability factors comprise the current route entering a flagged region.

10. The anomaly detection system of claim 9, wherein the executed instructions cause the anomaly detection system to determine the flagged region based on one or more of third-party crime data, or the flagged region being identified in a user profile of the respective user.

11. The anomaly detection system of claim 1, wherein the correlated route shapes comprise a plurality of distinct routes between a common start point or region and a common end point or region.

12. The anomaly detection system of claim 1, wherein an initial action of the safety protocol comprises transmitting a status query to a mobile device of the respective user, and wherein a subsequent action in the safety protocol comprises contacting an emergency authority to report the probable anomaly.

13. The anomaly detection system of claim 12, wherein the executed instructions further cause the anomaly detection system to:
   in response to the status query, receive an indication of a negative condition from the mobile device of the respective user; and
   in response to receiving the indication, transmit a driver directive to a mobile device of a driver providing transport service to the respective user indicating an emergency condition.

14. The anomaly detection system of claim 12, wherein the executed instructions cause the anomaly detection system to monitor the current route traveled by the respective user by receiving location data from global positioning system (GPS) resources of the mobile device of the respective user.

15. The anomaly detection system of claim 1, wherein the executed instructions further cause the anomaly detection system to:
   compare the current route traveled by the respective user to a route inputted by the selected driver into a mapping resource of a mobile device of the selected driver.

16. The anomaly detection system of claim 1, wherein the one or more actions performed in accordance with the safety protocol include:
 providing a selectable emergency feature on a graphical user interface for the respective user during the current route; and
 receiving a user selection of the selectable emergency feature.

17. A non-transitory computer readable medium storing instructions that, when executed by one or more processors of an anomaly detection system, cause the anomaly detection system to:
 construct routine route profiles for users of a transport service by, for each of the users, (i) collecting historical route data, and (ii) identifying correlated route shapes in the historical route data;
 monitor a current route traveled by a respective one of the users;
 identify a matching routine route profile of the respective user;
 based on the matching routine route profile, determine a probable anomaly in the current route by performing a real-time probabilistic calculation and determining that a number of probability factors collectively exceed an anomaly threshold; and
 in response to determining the probable anomaly, perform one or more actions in accordance with a safety protocol, including transmitting a status query to a mobile device of the respective user or contacting an emergency authority to report the probable anomaly.

18. A computer-implemented method for detecting route anomalies, the method performed by one or more processors of an anomaly detection system and comprising:
 constructing routine route profiles for users of a transport service by, for each of the users, (i) collecting historical route data, and (ii) identifying correlated route shapes in the historical route data;
 monitoring a current route traveled by a respective one of the users;
 identifying a matching routine route profile of the respective user;
 based on the matching routine route profile, determining a probable anomaly in the current route by performing a real-time probabilistic calculation and determining that a number of probability factors collectively exceed an anomaly threshold; and
 in response to determining the probable anomaly, performing one or more actions in accordance with a safety protocol, including transmitting a status query to a mobile device of the respective user or contacting an emergency authority to report the probable anomaly.

19. The computer-implemented method of claim 18, further comprising:
 prior to monitoring the current route:
 receiving a pick-up request from the respective user; and
 selecting a driver to service the pick-up request.

20. The computer-implemented method of claim 19, wherein the pick-up request includes a destination, and further comprising:
 identifying the matching routine route profile prior to monitoring the current route, based on an initial location of the respective user and the destination.

* * * * *